(12) United States Patent
Whitney et al.

(10) Patent No.: US 8,280,612 B2
(45) Date of Patent: Oct. 2, 2012

(54) MULTI-PULSE ENABLE DETERMINATION AND TRANSITION CONTROL SYSTEMS AND METHODS

(75) Inventors: Christopher E. Whitney, Highland, MI (US); Michael Livshiz, Ann Arbor, MI (US); Christopher R. Graham, Lake Orion, MI (US); Rafat F Hattar, Macomb, MI (US); Cheryl A. Williams, Howell, MI (US)

(73) Assignee: GM Global Technology Operations LLC

( * ) Notice: Subject to any disclaimer, the term of this patent is extended or adjusted under 35 U.S.C. 154(b) by 674 days.

(21) Appl. No.: 12/535,950

(22) Filed: Aug. 5, 2009

(65) Prior Publication Data
US 2010/0057330 A1 Mar. 4, 2010

Related U.S. Application Data

(60) Provisional application No. 61/173,785, filed on Apr. 29, 2009.

(51) Int. Cl.
G06F 17/00 (2006.01)
G06F 17/18 (2006.01)

(52) U.S. Cl. ........................................ 701/103; 123/299

(58) Field of Classification Search .................. 701/103, 701/54; 123/299, 300, 304, 316, 559.1
See application file for complete search history.

(56) References Cited

U.S. PATENT DOCUMENTS

| 7,072,758 B2 * | 7/2006 | Kolmanovsky et al. ....... 701/103 |
| 2008/0243355 A1 * | 10/2008 | Whitney et al. ............... 701/102 |
| 2009/0118977 A1 * | 5/2009 | Whitney et al. ............... 701/103 |
| 2009/0276128 A1 * | 11/2009 | Whitney et al. ................ 701/54 |

OTHER PUBLICATIONS

U.S. Appl. No. 12/436,362, filed May 6, 2009, Michael Livshiz.
U.S. Appl. No. 12/481,913, filed Jun. 10, 2009, Michael Livshiz.

* cited by examiner

Primary Examiner — Mahmoud Gimie

(57) ABSTRACT

A coordinated torque control (CTC) system is provided that includes an engine capacity module, a multi-pulse enable module, and a catalyst light off torque reserve module. The engine capacity module determines a torque capacity of an engine and generates a maximum engine torque capacity signal. The multi-pulse enable module enables a multi-pulse mode that includes the injection of at least two pulses of fuel into a cylinder of the engine during a combustion cycle. The multi-pulse enable module generates a multi-pulse desired signal to operate in the multi-pulse mode based on the maximum engine torque capacity signal, a catalyst light off signal, and a brake torque request signal. The catalyst light off torque reserve module generates a torque reserve corrected signal based on the multi-pulse desired signal.

19 Claims, 6 Drawing Sheets

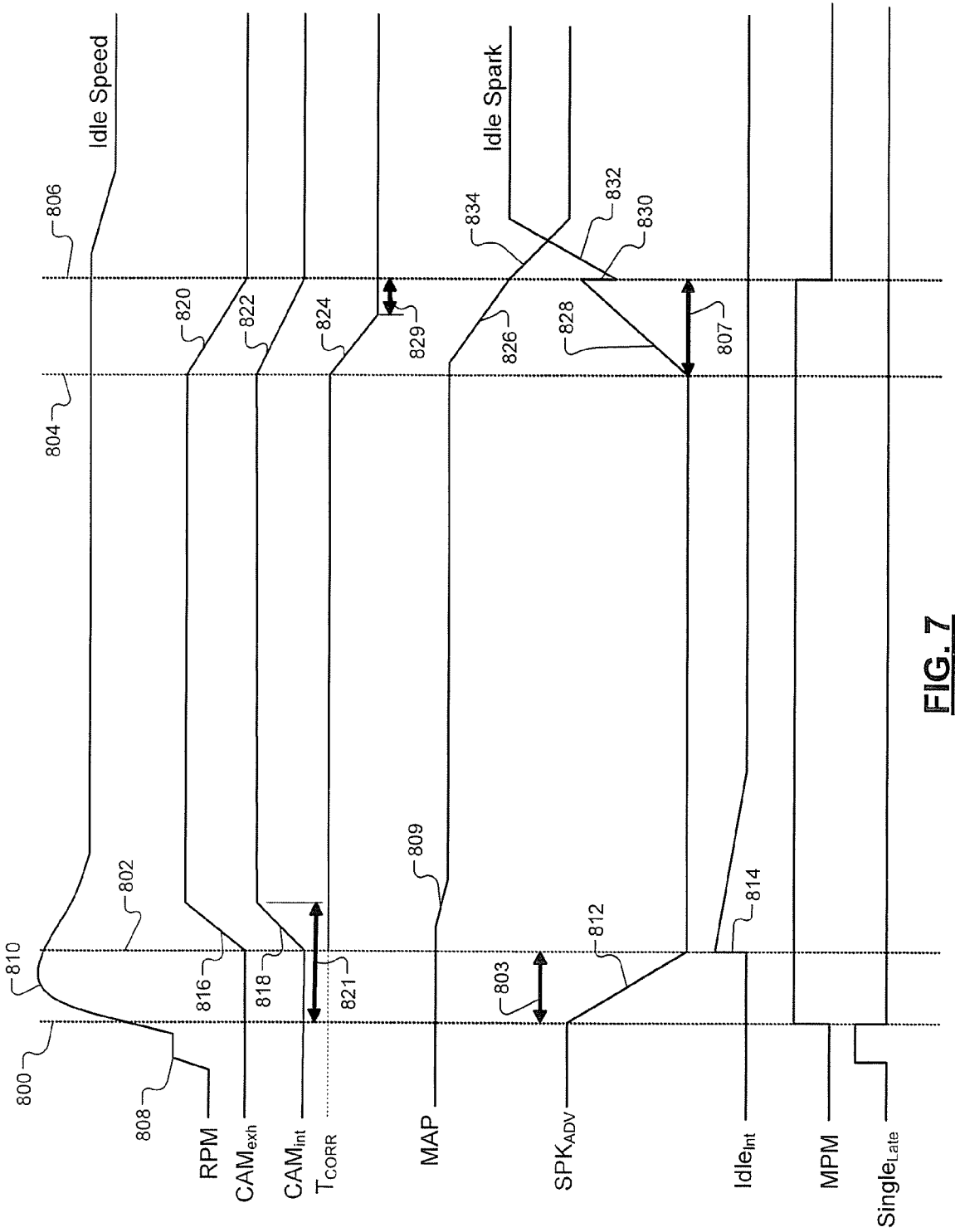

MULTI-PULSE ENABLE DETERMINATION AND TRANSITION CONTROL SYSTEMS AND METHODS

CROSS-REFERENCE TO RELATED APPLICATIONS

This application claims the benefit of U.S. Provisional Application No. 61/173,785, filed on Apr. 29, 2009. The disclosures of the above applications is incorporated herein by reference in its entirety.

This application is related to U.S. Provisional Application No. 61/171,535, filed Apr. 22, 2009 and U.S. Provisional Application No. 61/190,471, filed Aug. 28, 2008.

FIELD

The present invention relates to engine control systems and more particularly to coordinated torque control based techniques for multi-pulse direct injection operation and transitioning.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) combusts an air/fuel fuel mixture within cylinders to drive pistons, which produces drive torque. Air flow into an ICE engine may be regulated via a throttle and adjustment in throttle area. Adjustment in throttle area alters air flow into the ICE. As the throttle area increases, the air flow into the engine increases. Fuel injection rate is adjusted in addition to adjustment in air flow to provide the air/fuel mixture. Increasing the amount of air and fuel provided to cylinders of the ICE increases torque output of the ICE. Engine control systems have been developed to control engine torque output.

Spark ignition direct injection (SIDI) refers to direct injection of fuel into cylinders of a spark ignited gasoline engine. SIDI allows for improved control of when fuel is injected into a cylinder. In a SIDI engine fuel may be injected at various times during a combustion cycle. This is unlike port fuel injected engines where fuel is injected, for example, into a port and/or intake manifold of an engine and before an intake stroke of a corresponding combustion cycle. The increased control that may be associated with an SIDI engine provides increased horsepower, reduced emissions and knock suppression.

SIDI may be used to operate an engine in a double pulse (split pulse) mode during engine startups to reduce emissions. During the double pulse mode two fuel pulses are generated during a single combustion cycle to provide a total injected fuel mass. The first injection may be provided during or before an intake stroke to provide an initial homogeneous lean mixture in a cylinder. The second injection may be provided late in a compression stroke to provide a rich easily ignited cloud around a tip of a spark plug.

The splitting of fuel injection into two fuel pulses allows for retarded spark timing and a more complete combustion with a leaner overall mixture of fuel and air. This minimizes hydrocarbon emissions while a catalytic converter is below an active operating temperature. The retarded spark transfers energy from a burning charge into heat in the exhaust, which quickly increases a temperature of a catalyst while minimizing passage of unburned hydrocarbons into the catalyst.

SUMMARY

In one embodiment, a coordinated torque control (CTC) system is provided that includes an engine capacity module, a multi-pulse enable module, and a catalyst light off torque reserve module. The engine capacity module determines a torque capacity of an engine and generates a maximum engine torque capacity signal. The multi-pulse enable module enables a multi-pulse mode that includes the injection of at least two pulses of fuel into a cylinder of the engine during a combustion cycle. The multi-pulse enable module generates a multi-pulse desired signal to operate in the multi-pulse mode based on the maximum engine torque capacity signal, a catalyst light off signal, and a brake torque request signal. The catalyst light off torque reserve module generates a torque reserve corrected signal based on the multi-pulse desired signal.

A method of operating a CTC system is provided that includes determining a torque capacity of an engine and generating a maximum engine torque capacity signal. A multi-pulse mode that includes the injection of at least two pulses of fuel into a cylinder of the engine during a combustion cycle is enabled. A multi-pulse desired signal is generated to operate in the multi-pulse mode based on the maximum engine torque capacity signal, a catalyst light off signal, and a brake torque request signal. A torque reserve corrected signal is generated based on the multi-pulse desired signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 a plot of exemplary engine control signals illustrating startup and transition from the multi-pulse CLO mode in accordance with an embodiment of the present disclosure.

DETAILED DESCRIPTION

Figure 1:
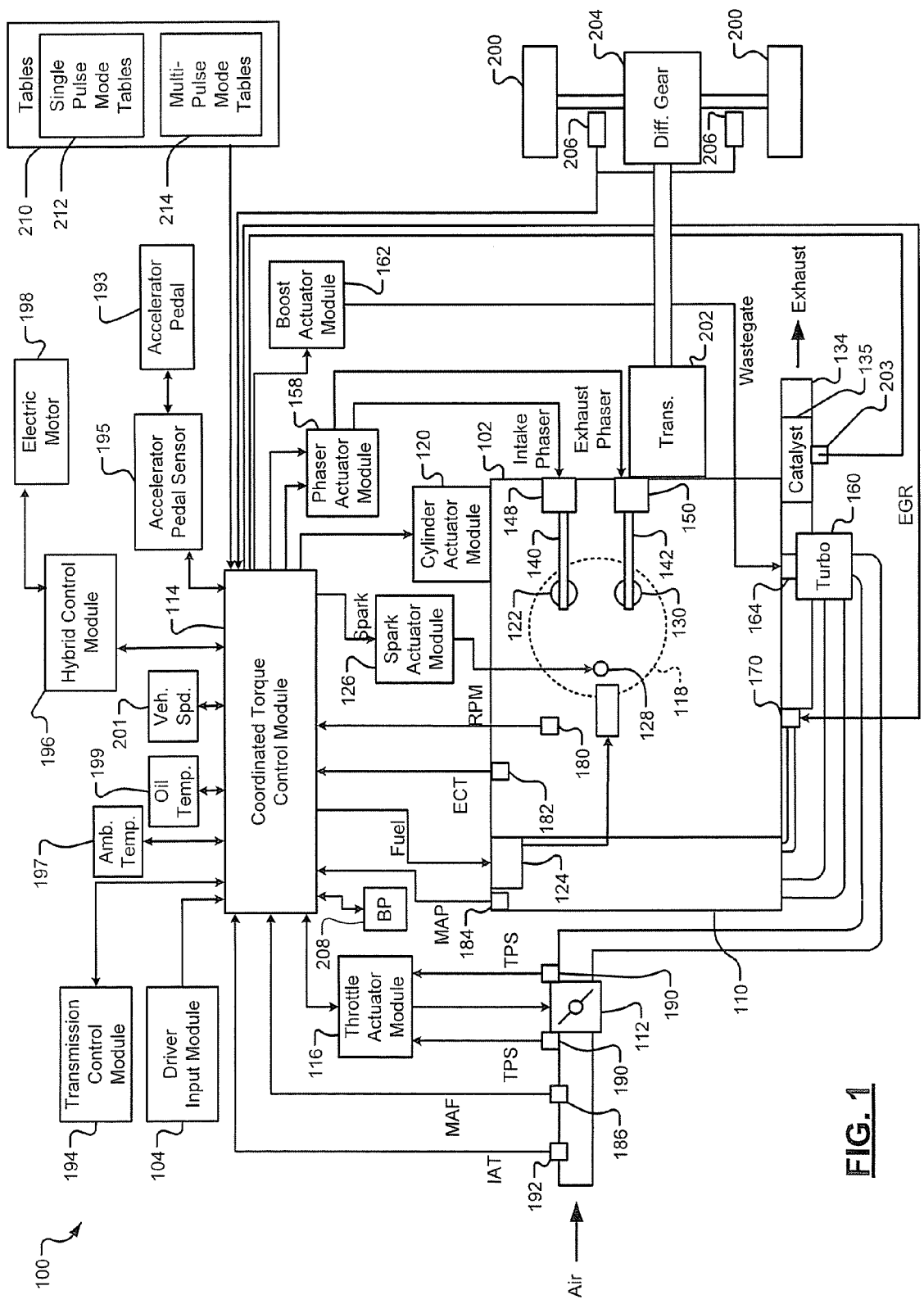
FIG. 1 is a functional block diagram of another hybrid powertrain system incorporating multi-pulse transition control in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are repeated during operation of the engine.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

In the following description, different fuel injection pulse modes are described. Transitions between the fuel injection pulse modes may be performed based on state of a catalyst light off (CLO). Catalyst light off refers to the quick heating of a catalyst of an exhaust system. A catalyst has an associated temperature operating range in which the catalyst is effective in reducing tailpipe hydrocarbon, carbon monoxide, and oxides of nitrogen emissions. By quickly heating the catalyst up to a temperature within the temperature operating range, tailpipe emissions are minimized.

A first fuel injection pulse mode, referred to as a single pulse mode (SPM), includes the injecting of a single pulse of fuel into a combustion chamber during a combustion cycle. A combustion cycle may, for example, in a 4-stroke engine, refer to a single sequencing through the 4 strokes (intake, compression, ignition, and exhaust). A single pulse mode may be used when an engine is not requiring a maximum CLO or when the engine torque requirement is high.

A second fuel injection pulse mode, referred to as a multi-pulse mode (MPM), includes the injecting of two or more pulses of fuel into a combustion chamber during a combustion cycle. A throttle may be in a wide-open position or approximately 85-95 open position during the multi-pulse mode. In one embodiment, two pulses of fuel are injected into a combustion chamber during a combustion cycle. The use of the multi-pulse mode allows for emission output control without the use of an air pump. An air pump is commonly used to inject oxygen-rich air into an exhaust system to support oxidation of exhaust gas and thus heating of a catalyst. For a double-pulse mode, a first injection may be provided at normal crankshaft angles to provide an initial homogeneous lean mixture. A second injection may be provided late in a compression stroke. For example only, the first pulse may provide a lean homogeneous mixture and the second pulse may provide additional fuel near the spark plug for strong ignition resulting in a more complete combustion of the combined charge. Ignition timing may be referred to as spark timing herein.

In the following embodiments a multi-pulse mode is used to provide an overall lean mixture, while providing a rich mixture near the spark plug of an engine. Complete combustion is provided happens with a net stoichiometric, lean or stoichiometric combustion event. In a single pulse mode, an overall mixture is typically rich to provide desired combustion. In the multi-pulse mode, a small rich cloud around the spark plug provides the desired combustion. This allows the overall mixture to be lean or leaner than in the single pulse mode which reduces hydrocarbon production and passage thereof through a catalyst.

The multi-pulse mode in combination with retarded spark (ignition) timing allows an engine to emit low hydrocarbon emissions while the catalyst is cold and inactive while transferring energy from a burning charge into thermal energy in the exhaust. This heats up the catalyst quickly with minimal passing of unburned hydrocarbons into the catalyst while the catalyst is operating in an inefficient state.

An engine control system that operates in a multi-pulse mode, such as a double or split pulse mode, may include three modes of operation. For example, the engine control system may operate in a double pulse mode, a single pulse mode (normal injection) and single late pulse mode (like double pulse but missing the first normal pulse). The double pulse mode may be performed during catalyst light off and may include two injection pulses per combustion cycle. As an example, a first pulse may include 60% of a total fuel charge for the combustion cycle and be generated before or during an intake stroke. A second pulse may include 40% of the total fuel charge and may be injected late in a compression stroke.

The single pulse mode includes a single injection pulse per combustion cycle. The single injection pulse may be generated before or during an intake stroke. The timing of the single injected pulse may be referred to as "normal" timing. The single late pulse mode is performed during cranking of an engine. The single late pulse mode is similar to the double pulse mode, but the first pulse is not generated. The engine control systems and modules in the following FIGS. 1-2 may operate in one or more of the three described modes.

When transitioning from a multi-pulse (or double pulse) mode to a single pulse mode, pulses may be blended together. The blending of pulses refers to the gradual adjustment in pulse timing of one or more of the pulses over multiple combustion cycles until the pulses occur at the same time or to essentially provide a single pulse. When transitioning from a single pulse mode to a multi-pulse mode timing of fuel pulses may be gradually adjusted (blended apart) such that the fuel pulses occur at separate and distinct times and during different strokes. To perform the blending of fuel pulses together and/or apart requires numerous torque models and a fuel control system that blends numerous operating regions.

The following described techniques do not include the blending together or the blending apart of fuel pulses. Instead, the following described techniques include the transitioning between single and multi-pulse modes at a specific time when certain conditions exist. The conditions are described below.

Torque production of an engine in a multi-pulse mode is different than torque production of an engine in a single pulse mode for a given air per cylinder (APC). For example, typically there is more torque produced in the single pulse mode than in a double pulse mode for a fixed APC and spark timing. The functional range of spark timing for a double pulse mode (e.g., −20° to 10° before top dead center (TDC)) may be lower than the functional range of spark timing for a single pulse mode (e.g., −5° to 30° before TDC). Also, camshaft phaser positions that are ideal for a multi-pulse mode may not provide desired combustion in a single pulse mode and visa versa.

The actuators associated with air flow and camshaft phaser angle adjustment are considered slow relative to the time required to adjust spark timing. The airflow actuators are unable to adjust torque output quick enough to prevent a jump in torque output when transitioning between different pulse modes. For this reason, spark timing is adjusted to allow for a quick system response and to provide the same torque output when transitioning between different pulse modes. For example, the retarding of spark timing when transitioning from a double pulse mode to a single pulse mode accounts for an increase in torque output that would be provided if spark timing was maintained at a constant setting. The retarding of the spark timing prevents increased torque output when fuel pulses are combined into a single pulse or a single pulse is generated, as opposed to multiple pulses.

When in a multi-pulse mode and during catalyst light off, spark timing is retarded to minimize hydrocarbon production. This spark timing may cause a misfire when in a single pulse mode for a given air flow. The transition to the single pulse mode, which may further retard spark timing would cause increased misfiring. For these reasons, a transition to single pulse mode should not be performed without first the reduction in air flow to simultaneously or during the same period prevent a misfire or torque output increase.

When operating in the multi-pulse mode, spark timing is retarded and an air flow that is near a maximum air flow is provided, the transmission of the corresponding engine is in neutral position, and a temperature of the engine is within a temperature range associated with a cold start. A near maximum air flow may refer to, for example, a nearly full intake manifold and ~90% pressure ratio or when manifold absolute pressure divided by barometric pressure is greater than or equal to ~90%. A neutral position refers to when a transmission is not in a drive or reverse gear. A cold start refers to the starting of an engine when the engine is below a predetermined temperature. An engine has a maximum output torque that supports a maximum load when operating in the multi-pulse mode. The maximum output torque and maximum load in the multi-pulse mode are less than the maximum output torque and load associated with the single pulse mode.

The following described embodiments provide coordinated torque control architectures for operation in single and/or multi-pulse modes. Control techniques are also described for the transitioning between the single and multi-pulse modes. Also, the following architectures provide techniques for determining when to enable a multi-pulse mode, when to enable a single pulse mode, and when to transition between single and multi-pulse modes. In addition, the following techniques include the adjustment in spark advance to provide the same toque output when in the single pulse mode as when in the multi-pulse mode to provide a transition between modes without a difference in torque output. Furthermore, air flow may be adjusted to prevent misfiring when transitioning. The techniques account for vehicle operator torque requests (e.g., accelerator pedal and transmission gear engagement inputs) while minimizing hydrocarbon generation and accounting for engine operating conditions (e.g., air density and engine oil temperature). The techniques minimize hydrocarbon production during engine startups.

Referring now to FIG. 1, a functional block diagram of a CTC system 100 that incorporates fuel injection mode transitioning for CLO is shown. The CTC system 100 may be configured for a non-hybrid vehicle, a hybrid electric vehicle and/or for a SIDI engine. The CTC system 100 includes an engine 102 that combusts an air/fuel mixture to produce drive torque for a vehicle based on a driver input module 104. Air is drawn into an intake manifold 110 through a throttle valve 112. A CTC module 114, which may be referred to as an engine control module, commands a throttle actuator module 116 to regulate opening of the throttle valve 112 to control the amount of air drawn into the intake manifold 110.

Air from the intake manifold 110 is drawn into cylinders of the engine 102. The engine 102 may include any number of cylinders. The CTC module 114 may instruct a cylinder actuator module 120 to selectively deactivate some of the cylinders to improve fuel economy.

Air from the intake manifold 110 is drawn into the cylinder 118 through an intake valve 122. The CTC module 114 controls the amount of fuel injected by a fuel injection system 124 that includes one or more fuel injectors 125. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders, as shown.

The injected fuel mixes with the air and creates the air/fuel mixture in the cylinder 118. A piston (not shown) within the cylinder 118 compresses the air/fuel mixture. Based upon a signal from the CTC module 114, a spark actuator module 126 energizes a spark plug 128 in the cylinder 118, which ignites the air/fuel mixture. The timing of the spark may be specified relative to the crankshaft angle when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. Exhaust passes through a catalyst 135.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

A CTC module 114 may regulate the position of the intake valve 122 and/or the exhaust valve 130 to regulate the quantity of air ingested and inert residual gases retained in the cylinder(s) 118. The CTC module 114 may also adjust operation of the fuel injector(s) 125, such as ON time or size of injector openings, to increase the amount of fuel injected into the cylinder(s) 118. The CTC module 114 may also adjust the timing of the exhaust camshaft(s) corresponding to the change in the A/F mixture.

The crankshaft angle at which the intake valve 122 is opened may be varied with respect to piston TDC by an intake cam phaser 148. The crankshaft angle at which the exhaust valve 130 is opened may be varied with respect to piston TDC by an exhaust cam phaser 150. A phaser actuator module 158 controls the intake cam phaser 148 and the exhaust cam phaser 150 based on signals from the CTC module 114.

The CTC system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The CTC module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The CTC system 100 may include an exhaust gas recirculation (EGR) valve 170, which selectively redirects exhaust gas back to the intake manifold 110. In various implementations, the EGR valve 170 may be located after the turbocharger 160. The CTC system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. The MAF sensor 186 may be located in a housing that includes the throttle valve 112.

The throttle actuator module 116 may monitor the position of the throttle valve 112 using one or more throttle position sensors (TPS) 190. The ambient temperature of air being drawn into the CTC system 100 may be measured using an intake air temperature (IAT) sensor 192. The CTC module 114 may use signals from the sensors to make control decisions for the CTC system 100.

The CTC module 114 may communicate with a transmission control module 194 to coordinate shifting gears in a transmission (not shown). For example, the CTC module 114 may reduce torque during a gear shift. The CTC module 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the CTC module 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is an amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phase angles, air/fuel ratio, and number of cylinders activated, respectively.

While electric motor 198 may provide torque in series and/or in parallel with the torque output of engine 102, it should be appreciated that other configurations are also contemplated to be within the scope of this description. For example, electric motor 198 may be implemented as one or more electric motors that provide torque directly to wheels 200 instead of passing through a transmission 202.

The combined torque of engine 102 and electric motor 198 is applied to an input of transmission 202. Transmission 202 may be an automatic transmission that switches gears in accordance with a gear change command from the CTC module 114. An output shaft of transmission 202 is coupled to an input of a differential gear 204. Differential gear 204 drives axles and wheels 200. Wheel speed sensors 206 generate signals that indicate a rotation speed of their respective wheels 200.

The CTC module 114 estimates an engine output torque to provide based on received sensor signals and other parameters described herein. The CTC module 114 may adjust position of the throttle, air-fuel ratio, valve timing, fuel injection, etc. to provide the estimated engine output torque. Based on a desired engine output torque, the CTC module 114 controls engine devices such that a desired air flow, a desired fuel injection, and/or a desired spark timing is achieved. The desired engine output torque may be based on a vehicle operator (driver) request and/or may be controller based, such as a torque output request from a cruise control system. In particular, the CTC module 114 controls the torque output of the engine based on the coordinated torque control methods and systems of the present disclosure.

The sensor signals that are received by the CTC module 114 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 198, and a vehicle speed sensor 201, an exhaust or catalyst temperature sensor 203.

The CTC module 114 communicates with the throttle actuator module 116 and a cruise control module. The CTC module 114 receives a throttle position signal from the throttle position sensor 190 and adjusts throttle position based on the throttle position signal. The CTC module 114 may control the throttle 112 using a throttle actuator based on a position of an accelerator pedal 193. The throttle actuator module 116 may include a motor or a stepper motor, which provides limited and/or coarse control of the throttle position.

The CTC module 114 may also control the throttle 112 using the throttle actuator based on input from the cruise control module, such as an axle torque request. The CTC module 114 also generates an effective pedal position signal, which represents a throttle position regardless of whether the vehicle operator is depressing the accelerator pedal 194 or the cruise control module is controlling the amount of throttle.

Air mass, volume, and pressure per cylinder may be determined and/or estimated based on signals from the sensors 184, 186. The CTC control module 114 may determine a throttle area based on a desired MAP and a desired MAF, and may generate a control signal to control the throttle based on the throttle area. The desired MAP and MAF may be determined based on engine speed and torque request signals.

The engine system 100 may further include a barometric pressure sensor 208. The barometric pressure sensor 208 may be used to determine environmental conditions, which may be further used to determine a desired throttle area. The desired throttle area may correspond to a specific throttle position.

The CTC system 100 may also include various tables 210, which may be used when performing arbitration and/or when performing various functions associated with the modules of the CTC module 114. Example modules of the CTC 114 are shown and described with respect to the embodiments of FIG. 2. The tables 210 may include single-pulse mode tables and/or torque models 212 and multi-pulse mode tables and/or torque models 214. The tables and/or torque models may each be associated with one or more of the steps described with respect to the embodiments of FIG. 3-7.

Figure 2:
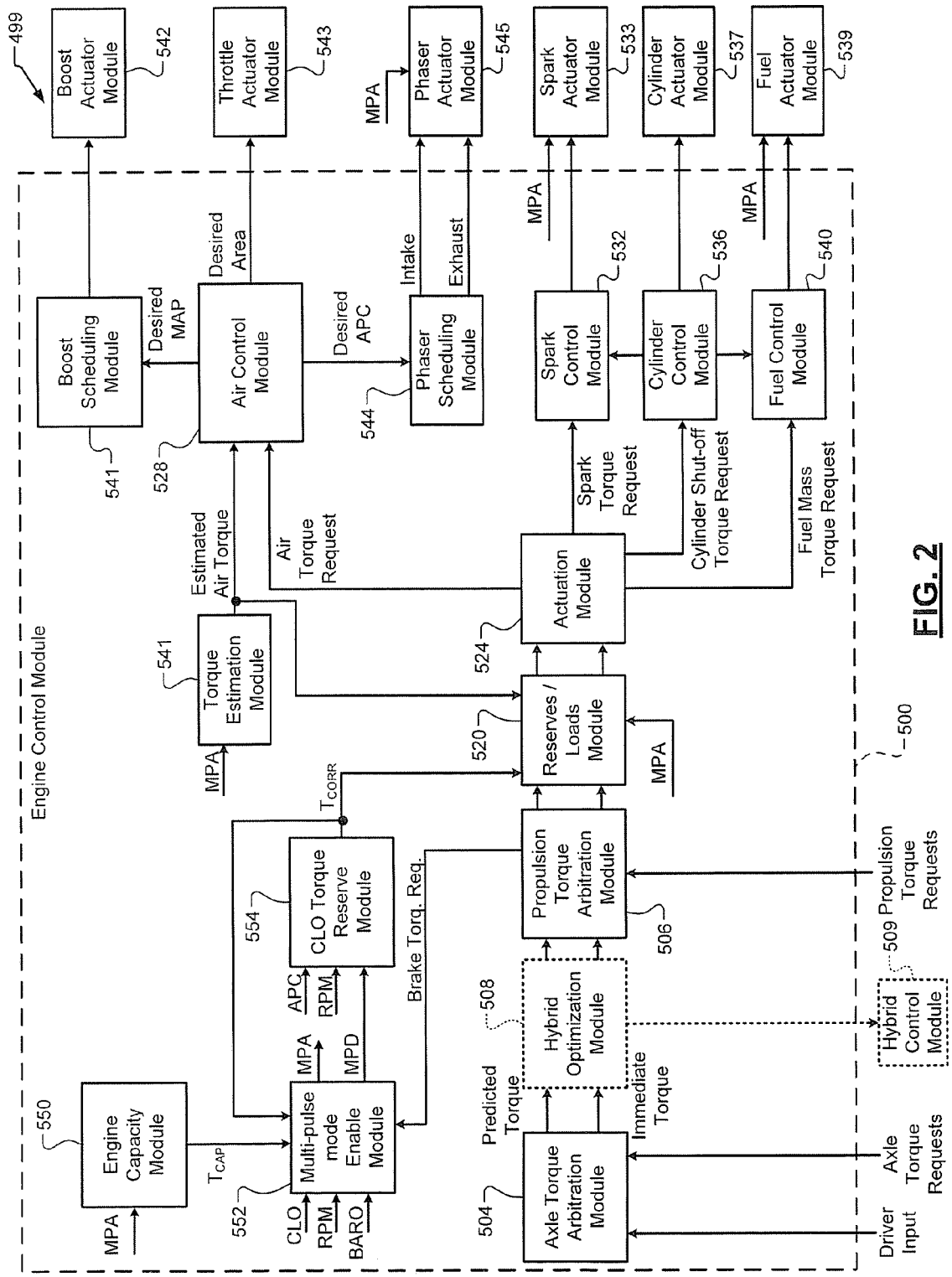
FIG. 2 is a functional block diagram of another CTC system in accordance with an embodiment of the present disclosure.

Referring now to FIG. 2, a functional block diagram of a CTC system 499 is presented. The CTC system 499 may be part of the CTC system 400. An exemplary implementation of an ECM 500 includes an axle torque arbitration module 504. The axle torque arbitration module 504 arbitrates between a driver input from a driver input module and other axle torque requests. For example, the driver input may be based on position of an accelerator pedal. The driver input may also be based on cruise control, which may be an adaptive cruise control that maintains a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine cutoff requests, such as may be generated when a critical fault is detected.

The axle torque arbitration module 504 outputs a predicted torque and an immediate torque based on the results of arbitrating between the received torque requests. The predicted torque is the amount of torque that the ECM 500 prepares to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, spark advance may be adjusted quickly, while the airflow response to cam phaser position and throttle changes may be slower to respond because changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, a throttle valve can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 504 outputs the predicted torque and the immediate torque to a propulsion torque arbitration module 506. In various implementations, the axle torque arbitration module 504 may output the predicted torque and immediate torque to a hybrid optimization module 508. The hybrid optimization module 508 determines how much torque should be produced by an engine and how much torque should be produced by an EM. The hybrid optimization module 508 then outputs modified predicted and immediate torque values to the propulsion torque arbitration module 506. In various implementations, the hybrid optimization module 508 may be implemented in a HCM 509.

The predicted and immediate torques received by the propulsion torque arbitration module 506 are converted from an axle torque domain (torque at the wheels) into a propulsion torque domain (torque at the crankshaft). This conversion may occur before, after, as part of, or in place of the hybrid optimization module 508.

The propulsion torque arbitration module 506 arbitrates between propulsion torque requests, including the converted predicted and immediate torques. The propulsion torque arbitration module 506 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by a TCM to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine without regard to torque. The propulsion torque arbitration module 506 may still receive these shutoff requests so that, for example, appropriate data can be fed back to other torque requesters. For example, all other torque requestors may be informed that they have lost arbitration. The propulsion torque arbitration module 506 may receive predicted and immediate torque requests from a RPM control module (not shown).

A reserves/loads module 520 receives the arbitrated predicted and immediate torque requests from the propulsion torque arbitration module 506. Various engine operating conditions may affect the engine torque output. In response to these conditions, the reserves/loads module 520 may create a torque reserve by increasing the predicted torque request.

For example only, a catalyst light-off process or a cold start emissions reduction process may require retarded spark advance for an engine. The reserves/loads module 520 may therefore increase the predicted torque request above an immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Corresponding torque reserves may be made to increase torque quickly to offset the decreasing changes in the engine torque output due to enleaning fuel during these processes.

The reserves/loads module 520 may also create a reserve in anticipation of a future load, such as the engagement of the air conditioning compressor clutch or power steering pump operation. The reserve for A/C clutch engagement may be created when the driver first requests air conditioning. Then, when the A/C clutch engages, the reserves/loads module 520 may add the expected load of the A/C clutch to the immediate torque request.

An actuation module 524 receives the predicted and immediate torque requests as output by the reserves/loads module 520. The actuation module 524 determines how the predicted and immediate torque requests will be achieved. The actuation module 524 may be engine type specific, with different control schemes for gas engines versus diesel engines. In various implementations, the actuation module 524 may define the boundary between modules that are engine independent and modules that are engine dependent.

For example, in a gas engine, the actuation module 524 may vary the opening of the throttle valve, which allows for a wide range of torque control. However, opening and closing the throttle valve results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 524 may generate an air torque request based on the predicted torque request. The air torque request may be equal to the predicted torque request, causing air flow to be set so that the predicted torque request can be achieved simply by changes to other actuators.

An air control module 528 may determine desired actuator values for slow actuators based on the air torque request. For example, the air control module 528 may control desired manifold absolute pressure (MAP), desired throttle area, and/or desired air per cylinder (APC). Desired MAP may be used to determine desired boost, and desired APC may be used to determine desired cam phaser positions.

In gasoline systems, the actuation module 524 may also generate a spark torque request, a cylinder shut-off torque request, and a fuel mass torque request. The spark torque request may be used by a spark control module 532 to determine how much to retard the spark (which reduces the engine torque output) from a calibrated spark advance. The spark control module 532 controls the spark actuator module 533.

In diesel systems, fuel mass may be the primary actuator for controlling engine torque output.

The cylinder shut-off torque request may be used by a cylinder control module 536 to determine how many cylinders to deactivate. The cylinder control module 536 may instruct the cylinder actuator module 120 to deactivate one or more cylinders of the engine 102. In various implementations, a predefined group of cylinders may be deactivated jointly. The cylinder control module 536 may also instruct a fuel control module 537 to stop providing fuel for deactivated cylinders and may instruct the spark control module 532 to stop providing spark for deactivated cylinders.

The fuel mass torque request may be used by the fuel control module 537 to vary the amount of fuel provided to each cylinder. For example only, the fuel control module 537 may determine a fuel mass that, when combined with the current amount of air per cylinder, yields stoichiometric combustion. The fuel control module 537 may instruct the fuel actuator module 539 to inject this fuel mass for each activated cylinder. During normal engine operation, the fuel control module 537 may attempt to maintain a stoichiometric air/fuel ratio.

The fuel control module 537 may increase the fuel mass above the stoichiometric value to increase engine torque output and may decrease the fuel mass to decrease engine torque output. In various implementations, the fuel control module 537 may receive a desired air/fuel ratio that differs from stoichiometry. The fuel control module 537 may then determine a fuel mass for each cylinder that achieves the desired air/fuel ratio.

The approach the actuation module 524 takes in achieving the immediate torque request may be determined by a mode setting. The mode setting may be provided to the actuation module 524, such as by the propulsion torque arbitration module 506, and may indicate an inactive mode, a pleasible mode, a maximum range mode, and an auto actuation mode.

In the inactive mode, the actuation module 524 may ignore the immediate torque request and attempt to achieve the predicted torque request. The actuation module 524 may therefore set the spark torque request, the cylinder shut-off torque request, and the fuel mass torque request to the predicted torque request, which maximizes torque output for the current engine air flow conditions. Alternatively, the actuation module 524 may set these requests to predetermined (such as out-of-range high) values to disable torque reductions from retarding spark, deactivating cylinders, or reducing the fuel/air ratio.

In the pleasible mode, the actuation module 524 may attempt to achieve the immediate torque request by adjusting only spark advance. The actuation module 524 may therefore output the predicted torque request to the air control module 528 and the immediate torque request to the spark control module 532. The spark control module 532 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 524 may output the predicted torque request as the air torque request and the immediate torque request as the spark torque request. In addition, the actuation module 524 may generate a cylinder shut-off torque request that is low enough to enable the spark control module 532 to achieve the immediate torque request. In other words, the actuation module 524 may decrease the cylinder shut-off torque request (thereby deactivating cylinders) when reducing spark advance alone is unable to achieve the immediate torque request.

In the auto actuation mode, the actuation module 524 may decrease the air torque request based on the immediate torque request. For example, the air torque request may be reduced only so far as is necessary to allow the spark control module 532 to achieve the immediate torque request by adjusting spark advance. Therefore, in auto actuation mode, the immediate torque request is achieved while allowing the engine to return to the predicted torque request as quickly as possible. In other words, the use of relatively slowly-responding throttle valve corrections is minimized by reducing the quickly-responding spark advance as much as possible.

A torque estimation module 541 may estimate torque output of the engine. This estimated torque may be used by the air control module 528 to perform closed-loop control of engine air flow parameters, such as MAP, throttle area, and phaser positions. For example only, a torque relationship such as that of equation 1 may be defined, where torque (T) is a function of air per cylinder (APC), spark advance (S), intake cam phaser position (I), exhaust cam phaser position (E), air/fuel ratio (AF), oil temperature (OT), and number of activated cylinders (#).

$$T=f(APC, S, I, E, AF, OT, \#) \quad (1)$$

Additional variables may be accounted for, such as the degree of opening of an exhaust gas recirculation (EGR) valve.

This relationship may be modeled by an equation and/or may be stored as a lookup table. The torque estimation module 541 may determine APC based on measured MAF and current RPM, thereby allowing closed loop air control based on actual air flow. Respective models, equations and/or tables may be used for the single and multi-pulse modes. The intake and exhaust cam phaser positions used may be based on actual positions, as the phasers may be traveling toward desired positions. In addition, a calibrated spark advance value may be used. This estimated torque may be referred to as an air torque (i.e., an estimate of how much torque could be generated at the current air flow, regardless of the actual engine torque output, which varies based on spark advance).

The air control module 528 may generate a desired manifold absolute pressure (MAP) signal, which is output to a boost scheduling module 541. The boost scheduling module 541 uses the desired MAP signal to control the boost actuator module 542. The boost actuator module 542 then controls one or more turbochargers and/or superchargers.

The air control module 528 may generate a desired area signal, which is output to a throttle actuator module 543. The throttle actuator module 543 then regulates the throttle valve to produce the desired throttle area. The air control module 528 may use the estimated torque and/or the MAF signal in order to perform closed loop control. For example, the desired area signal may be controlled based on a comparison of the estimated torque and the air torque request.

The air control module 528 may also generate a desired air per cylinder (APC) signal, which is output to a phaser scheduling module 544. Based on the desired APC signal and the RPM signal, the phaser scheduling module 544 may control positions of the intake and/or exhaust cam phasers using a phaser actuator module 545.

Referring back to the spark control module 532, spark advance values may be calibrated at various engine operating conditions. For example only, a torque relationship may be inverted to solve for desired spark advance. For a given torque request ($T_{des}$), the desired spark advance ($S_{des}$) may be determined based on equation 2.

$$S_{des}=T^{-1}(T_{des}, APC, I, E, AF, OT, \#) \quad (2)$$

This relationship may be embodied as an equation and/or as a lookup table. The air/fuel ratio (AF) may be the actual ratio, as indicated by the fuel control module 540.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as lower octane-fuel) and environmental factors. The torque at the calibrated spark advance may therefore be less than MBT.

The ECM 500 may also include an engine capacity module 550, a multi-pulse mode enable module 552, and a CLO torque reserve module 554. The engine capacity module 550 determines torque capacities of the engine in single and/or multi-pulse modes. The multi-pulse mode enable module 552 generates multi-pulse actual (MPA) and multi-pulse desired (MPD) signals based on a CLO signal, an engine speed signal (RPM), a barometric pressure signal (BARO), a torque reserve corrected signal $T_{CORR}$. Examples of how a torque reserve corrected signal $T_{CORR}$ may be generated are described in U.S. patent application Ser. No. 12/481,913, filed on Jun. 10, 2009.

The MPA signal refers to the pulse mode that is commanded. The engine operates in the commanded pulse mode upon generation of the MPA signal. The MPA signal is provided to the reserves/loads module 520, the torque estimation module 541, the phaser control or actuator modules 544, 545, the spark control or actuator modules 532, 533, and the fuel control or actuator modules 539, 540. The MPD signal refers to a steady state desired pulse mode and is provided to the CLO torque reserve module 554 and the phaser scheduling or actuator modules 544 and 545. The MPD signal is a leading indicator of the MPA signal and can be used to prepare the CTC system 499 for a transition between single and multi-pulse modes. The MPA and MPD signals are further described below. The CLO torque reserve module 554 generates the torque reserve corrected signal $T_{CORR}$ based on the MPD signal and, for example, an air per cylinder (APC) signal, engine speed (RPM), spark advance desired, coolant temperature, etc.

Multi-Pulse Mode Enablement Determination

The CTC systems 400, 499, which are engine control systems, may operate in a multi-pulse mode with a certain spark advance timing when in a CLO mode, referred to as the multi-pulse CLO mode. Numerous different parameters affect a systems ability to satisfy vehicle operator torque demands and multi-pulse CLO modes of operation. Two of the parameters are accelerator pedal position and transmission engagement state may be used when determining whether to operate in the single or multi-pulse modes. Accelerator pedal position provides vehicle operator intent information and transmission engagement state is an indicator of engine load. Other parameters may include power steering, air conditioning, etc. These parameters may be associated with three main categories. The categories are: 1) flywheel load (brake torque $BT_{REQ}$); 2) maximum engine torque capacity $T_{CAP}$; and 3) desired engine operating conditions (e.g., spark advance) of the multi-pulse CLO mode.

The brake torque $BT_{REQ}$ refers to output torque of the engine at the crankshaft. The brake torque $BT_{REQ}$ may be determined via the propulsion torque arbitration module 506.

The brake torque $BT_{REQ}$ at idle is based on transmission temperature, transmission state (e.g., park, neutral or drive states), and idle speed of the engine. The brake torque $BT_{REQ}$ is dependent on the vehicle operator demands (e.g., accelerator pedal position), road surface (e.g. wheel friction) and transmission drive gear when the driver tips in to the pedal (e.g., non-zero accelerator pedal position). The brake torque $BT_{REQ}$ may be determined using equation 3.

$$BT_{REQ}=T_{ped}+T_{IDLE}=T_{ENG}-T_{Acces} \quad (3)$$

$T_{ped}$ is torque requested based on accelerator pedal position. $T_{IDLE}$ is idle torque when the accelerator pedal is at a zero position (no tip in from driver), $T_{ENG}$ torque produced by the engine, and $T_{Acces}$ is torque used by accessories of the engine. Accessory torque $T_{Acces}$ may include power steering torque $T_{PS}$, air conditioning torque $T_{AC}$, alternator/generator torque $T_G$, etc.

The maximum engine torque capacity $T_{CAP}$ may include maximum available predicted and immediate torques $T_{prcap}$, $T_{imcap}$. The maximum engine torque capacity $T_{CAP}$ is based on internal component load of the engine, operation of engine accessories (e.g., power steering, air conditioning, alternator/generator, etc.), and air density and fuel quality received by the engine. The air density affects the maximum engine torque capacity because the air density is directly related to the amount of combustible air the engine can consume. The fuel quality affects knock generation and the ability of an engine to produce power.

Internal component load is based on oil and coolant temperatures of the engine, which is related to friction between engine components and air density. Friction between engine components and air density affect the amount of engine pumping losses. Air density is based on air pressure and temperature. The oil and coolant temperatures, the air density, the air pressure and temperature, may be determined and/or detected via corresponding sensors and modules described above. Engine accessory loading is based on the engine speed RPM, alternator/generator state, and air conditioning clutch state (e.g., engaged or disengaged).

Spark timing is retarded to improve emissions during the multi-pulse CLO mode. Air flow is increased to maintain the retarded spark timing and to sustain the required engine torque. A throttle may be in a wide open or nearly wide open state during the multi-pulse CLO mode. Air flow rate to the engine may change based on the fuel mode, the spark advance timing, and the engine speed RPM. The fuel mode, the spark advance timing and the engine speed RPM may be fixed for a given ambient condition, which causes the air flow rate to change to satisfy multi-pulse mode operation. For example, air flow rate may change based on engine speed at idle, which is based on coolant temperature, to maintain operation in the multi-pulse CLO mode and provide a requested spark advance timing. Spark advance timing is also a function of the coolant temperature and the engine speed RPM.

The multi-pulse mode enable module 552 determines whether the air flow rate to sustain operation in the multi-pulse CLO mode can be maintained. The multi-pulse mode enable module 552 may enable the multi-pulse CLO mode or transition from the multi-pulse CLO mode to a single pulse mode based on whether the air flow rate can be sustained. The multi-pulse mode enable module 552 may enable the multi-pulse CLO mode when the air flow rate can be sustained. The multi-pulse mode enable module 552 may transition from the multi-pulse CLO mode to a single pulse mode when the air flow rate can not be sustained.

The following described embodiments account for the three categories of parameters in the torque domain. The multi-pulse mode enable module 552 may determine whether to enable or transition from the multi-pulse CLO mode based on equation 4 (basis equation), where $CAL_1$ is a first calibration offset.

$$BT_{REQ}+T_{CORR}>T_{CAP}+CAL_1 \quad (4)$$

The multi-pulse mode enable module 552 may set the MPD signal to False or LOW when the brake torque $BT_{REQ}$ plus the torque reserve corrected signal $T_{CORR}$ (for the multi-pulse CLO mode) is greater than what the maximum engine capacity torque $T_{CAP}$ plus the first calibration offset $CAL_1$. This indicates that the brake torque may not be sustained in the multi-pulse mode and a transition to single pulse mode is desired.

Figure 3:
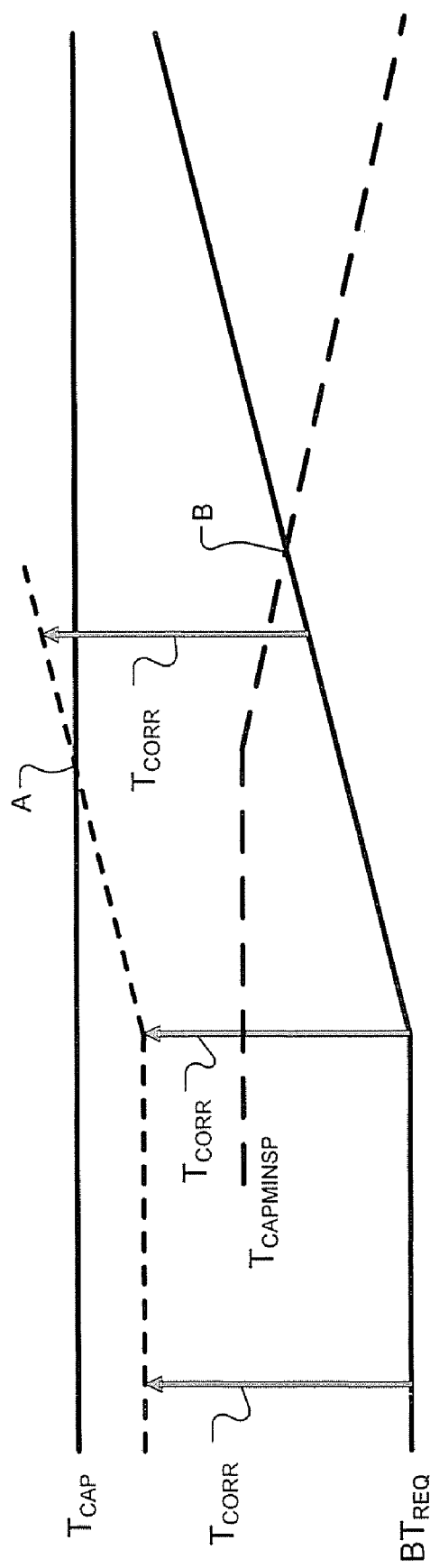
FIG. 3 is a plot of exemplary brake torque, maximum engine capacity and engine torque signals in accordance with an embodiment of the present disclosure.

Referring now also to FIG. 3, a plot of exemplary brake torque and maximum engine capacity signals are shown. At point A, the brake torque $BT_{REQ}$ plus the torque reserve corrected signal $T_{CORR}$ (for the multi-pulse CLO mode) is approximately equal to the maximum engine capacity torque $T_{CAP}$. Arrows 560 represent the torque reserve corrected signal $T_{CORR}$.

The brake torque $BT_{REQ}$ may be determined by the propulsion torque arbitration module 506. The CTC systems 400, 499 may operate the engine at an idle speed based on the brake torque $BT_{REQ}$. The CTC systems 400, 499 may have open loop information, such as transmission loads in park, neutral and drive states and transmission loads at different engine speeds. The propulsion torque arbitration module 506 receives information from closed loop engine speed control, which accounts for unknown loads or errors. The unknown loads or errors may refer to power steering torque $T_{PS}$, road surface changes, alternator/generator torque $T_G$, etc. The brake torque $BT_{REQ}$ may be determined based on accelerator pedal position.

The torque reserve corrected signal $T_{CORR}$ may be determined by the CLO Torque Reserve module 554. The torque reserve corrected signal $T_{CORR}$ may be determined based on spark advance timing for a current engine speed and other operating conditions using a torque model. The torque model includes engine internal loads and engine accessory loads. The torque reserve corrected signal $T_{CORR}$ may be used to adjust air flow. Air flow in the multi-pulse CLO mode may be greater than air flow in the single pulse mode. The additional air flow may be indicated to the actuation module 524 in the form of an increased predicted torque request.

The maximum engine capacity torque $T_{CAP}$ may be determined using the torque model with inputs that provide state of the current operating environment and engine. The torque model may account for internal friction of the engine based on engine oil temperature. The torque model may account for accessory loads based on estimates of alternator/generator torque, air conditioning state and air density. In one embodiment, the maximum engine capacity torque $T_{CAP}$ may be determined based on a current (fueling burned) equivalence ratio. The current equivalence ratio may be equal to a stoichiometric air fuel ratio divided by an equivalence ratio commanded. The current equivalence ratio is used due to lack of complete burn off of fuel during an engine cold start.

The first calibration offset $CAL_1$ may be used to adjust when to transition from the multi-pulse CLO mode to the single pulse mode. The first calibration offset $CAL_1$ may be used to exit from the multi-pulse CLO mode early or late relative to a predetermined exit time. The first calibration offset $CAL_1$ may also be used to account for possible system calculation errors.

Figure 4:
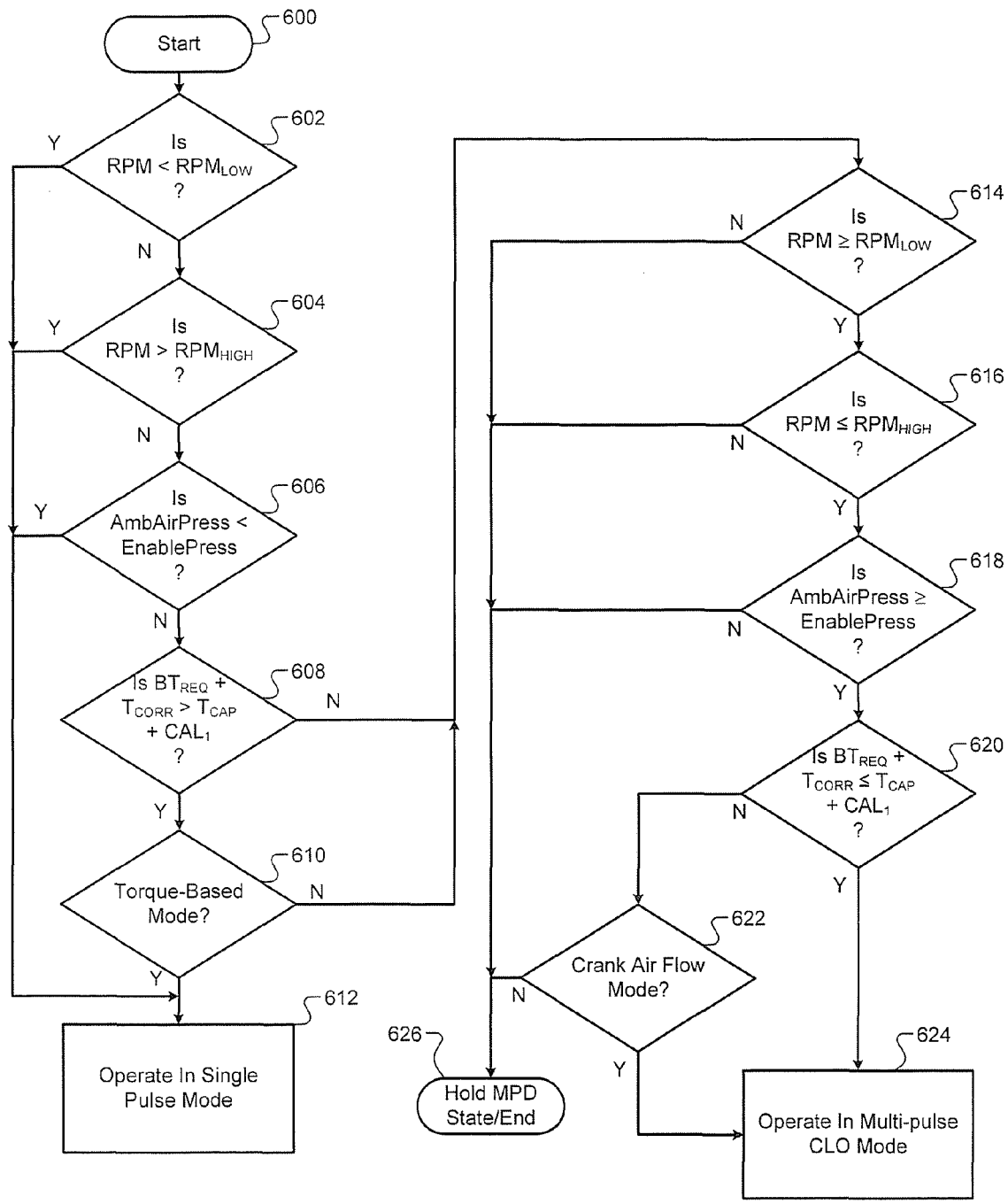
FIG. 4 illustrates a method of enabling a multi-pulse CLO mode in accordance with an embodiment of the present disclosure.
Figure 5:
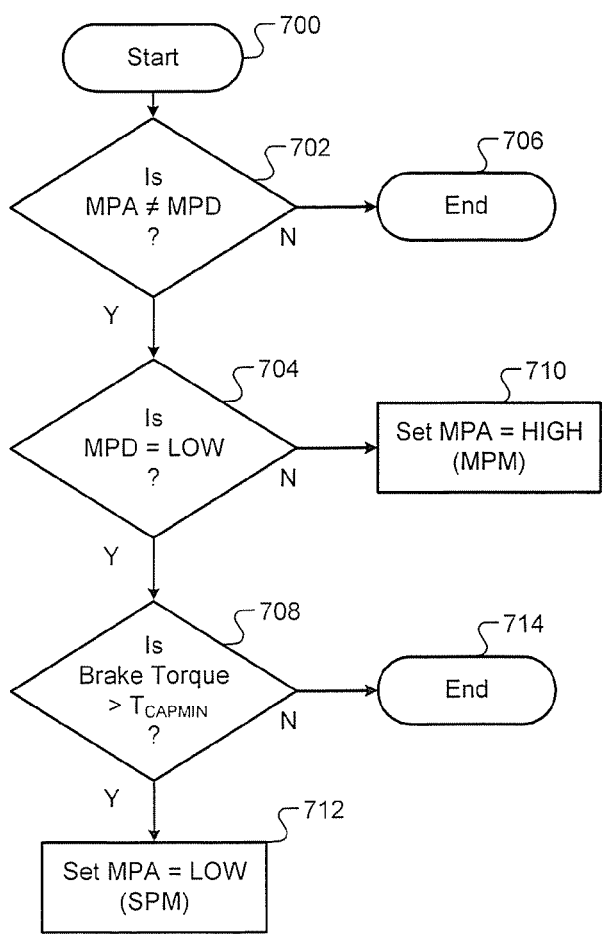
FIG. 5 illustrates a method of transitioning between single pulse and multi-pulse modes in accordance with an embodiment of the present disclosure.
Figure 6:
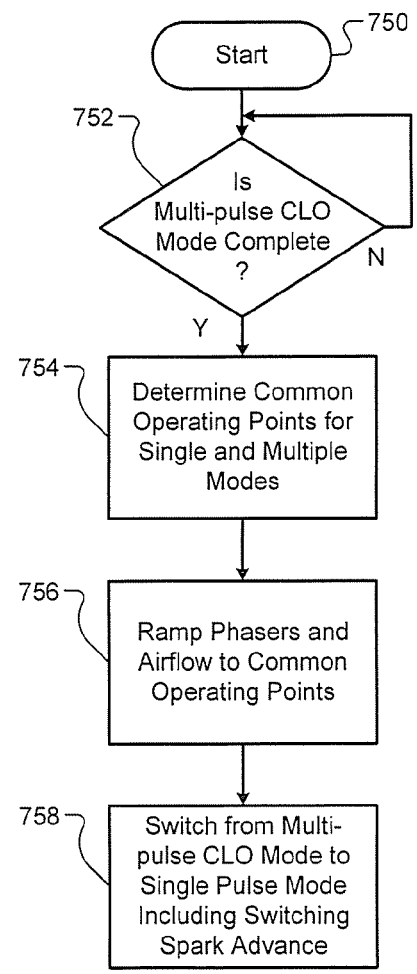
FIG. 6 illustrates a method of exiting the multi-pulse CLO mode.

The following FIGS. 4-6, methods of operating a CTC system are shown. Referring now to FIG. 4, a method of enabling a multi-pulse CLO mode is shown. The method may begin at 600. In steps 602 and 604, the multi-pulse mode enable module 552 may determine when the engine speed RPM is less than a first engine speed threshold $RPM_{LOW}$ or greater than a second engine speed threshold $RPM_{HIGH}$. The multi-pulse mode enable module 552 may include an engine speed criteria that is used to prevent operation in the multi-pulse CLO mode to a predetermined range of engine speeds. For example, the multi-pulse mode enable module 552 may prevent operation in the multi-pulse mode when the engine speed RPM is greater then a predetermined engine speed. In one embodiment the engine speed is equal to an idle engine speed. In the embodiment shown, when the engine speed RPM is less than the first engine speed threshold $RPM_{LOW}$ or greater than the second engine speed threshold $RPM_{HIGH}$, the multi-pulse mode enable module 552 proceeds to step 610, otherwise to step 606.

In step 606, the multi-pulse mode enable module 552 determines when the ambient air pressure AmbAirPress is less than a predetermined ambient air pressure EnablePress. The multi-pulse mode enable module 552 may include an ambient air pressure criterion. For example, the multi-pulse mode enable module 552 may prevent operation in the multi-pulse CLO mode when an ambient air pressure AmbAirPress indicates system operation at an altitude that is greater than a predetermined altitude. In the embodiment shown, the multi-pulse mode enable module 552 proceeds to step 612 when the ambient air pressure AmbAirPress is less than the predetermined ambient air pressure EnablePress, otherwise to step 608.

In step 608, the multi-pulse mode enable module 552 may determine whether equation 4 is satisfied. The multi-pulse mode enable module 552 may proceed to step 612 when equation 4 is satisfied, otherwise to step 614.

In step 610, the multi-pulse mode enable module 552 may proceed to step 612 when operating in the torque-based mode and not in the actuator-based mode. The multi-pulse mode enable module 552 may maintain operation in the multi-pulse CLO mode during startup and when a start flare occurs. A start flare refers to a spike or large increase in engine speed when starting an engine. The CTC systems 400, 499 may limit the engine speed to a predetermined start speed when starting the engine. Some torque values generated during a start flare condition may not reflect the torque that is needed for idle engine speed operation and/or to satisfy driver input torque demands. The values may reflect torque needed for idle engine speed operation and/or to satisfy driver input torque demands when the CTC systems 400, 499 switch from an actuator-based mode to a torque-based mode.

In step 612, the multi-pulse mode enable module 552 may maintain operation in the single pulse mode or transition to operation in the single pulse mode depending upon the current operating mode. The transition may include the setting of the MPD signal to LOW, and then the MPA signal to LOW when the transition criteria described below are satisfied.

In steps 614 and 616, the multi-pulse mode enable module 552 may determine when the engine speed RPM is greater than or equal to the first engine speed threshold $RPM_{LOW}$ or less than or equal to the second engine speed threshold $RPM_{HIGH}$. In the embodiment shown, when the engine speed RPM is greater than or equal to the first engine speed threshold $RPM_{LOW}$ or less than or equal the second engine speed threshold $RPM_{HIGH}$, multi-pulse mode enable module 552 proceeds to step 626, otherwise to step 618.

Steps 602 and 604 are used for enablement (enable pair) and steps 614 and 616 are used for disablement (disable pair). The $RPM_{LOW}$ and $RPM_{HIGH}$ thresholds of steps 602 and 604 are offset from the $RPM_{LOW}$ and $RPM_{HIGH}$ thresholds used in steps 614 and 616 to provide hysteresis, which prevents toggling back and forth between modes of operation when the same or single thresholds are used. The $RPM_{LOW}$ and $RPM_{HIGH}$ thresholds of steps 602 and 604 may be calibrated to be farther apart from each other than the $RPM_{LOW}$ and $RPM_{HIGH}$ thresholds of steps 614 and 616.

In step 618, the multi-pulse mode enable module 552 determines when the ambient air pressure AmbAirPress is greater than or equal to the predetermined ambient air pressure EnablePress. In the embodiment shown, the multi-pulse mode enable module 552 proceeds to step 620 when the ambient air pressure AmbAirPress is greater than or equal to the predetermined ambient air pressure EnablePress, otherwise to step 626.

In step 620, the multi-pulse mode enable module 552 may determine whether equation 4 is satisfied. The multi-pulse mode enable module 552 may proceed to step 624 when equation 4 is satisfied, otherwise to step 622 where crank airflow mode is evaluated.

In step 622, the multi-pulse mode enable module 552 determines when the CTC systems 400, 499 are operating in a crank air flow mode. The crank air flow mode refers to a predetermined air flow provided during cranking of the engine. The multi-pulse mode enable module 552 proceeds to step 624 when the CTC systems 400, 499 are operating in the crank air flow mode. The method of FIG. 4 may end at step 626, which may include the holding of the last MPD state.

In step 624, the multi-pulse mode enable module 552 may maintain operation in the multi-pulse mode or transition to operation in the multi-pulse mode depending upon the current operating mode. The transition may include the setting of the MPD signal HIGH.

Transitioning In and Out of Multi-pulse CLO Mode

During operation in the multi-pulse CLO mode, the multi-pulse mode enable module 552 may determine whether to exit the multi-pulse CLO mode by setting MPD to LOW. The CTC systems 400, 499 may exit the multi-pulse mode (set MPA signal to LOW) and return to operating in the multi-pulse mode (MPA signal is set to HIGH) under certain conditions. A transition out of and then back into the multi-pulse mode may occur, for example, when there is a tip in of the accelerator pedal (driver requests increased torque output) and then the accelerator pedal is returned to (or closer to) a zero pedal position. This may occur when equation 4 is satisfied.

The torque reserve corrected signal $T_{CORR}$ may not be determined for multi-pulse mode while operating in the single pulse mode. The multi-pulse mode enable module 552 uses a previous or last saved torque reserve corrected signal $T_{CORR}$ value (such as that determined in the multi-pulse CLO mode) when the torque reserve corrected signal $T_{CORR}$ for multi-pulse mode can not be determined. For example, during operation in the multi-pulse CLO mode, the multi-pulse mode enable module 552 and/or the CLO torque reserve module 554 stores in memory and iteratively updates a torque reserve corrected signal $T_{CORR}$ value. This value may be used when determining whether equation 4 is satisfied. A hysteresis calibration may be used to prevent switching in and out of the multi-pulse CLO mode. For example, when the brake torque $BT_{REQ}$ plus the torque reserve corrected signal $T_{CORR}$ is within a predetermined range of the maximum engine capacity torque $T_{CAP}$ plus the first calibration offset $CAL_1$, the multi-pulse mode enable module 552 may remain in the single pulse mode or the multi-pulse CLO mode without transitioning between modes.

Exiting the multi-pulse CLO mode upon tip in of an accelerator pedal or change in transmission gear state may not minimize exhaust emissions. During CLO, the multi-pulse mode enable module 552 maintains operation in the multi-pulse CLO mode to the extent possible while satisfying idle and driver torque requests. This minimizes emissions.

The method of FIG. 4, may be used while the multi-pulse CLO mode is active to determine whether to transition out of the multi-pulse CLO mode to the single pulse mode. Other criteria may be used to determine whether the multi-pulse CLO mode and/or the CLO mode should be active, such as coolant temperature, catalyst temperature and engine run time. For example, the multi-pulse mode enable module 552 may prevent operation in the multi-pulse CLO mode and/or the CTC system 499 may prevent operation in the CLO mode when the coolant temperature is greater than a predetermined coolant temperature. As another example, the multi-pulse mode enable module 552 may prevent operation in the multi-pulse CLO mode and/or the CTC system 499 may prevent operation in the CLO mode when the catalyst temperature (temperature of catalyst in the exhaust system) is greater than a predetermined catalyst temperature.

Another criterion may be engine run time. The multi-pulse mode enable module 552 may prevent operation in the multi-pulse CLO mode and/or the CTC system 499 may prevent operation in the CLO mode when the engine run time is greater than a predetermined engine run time. The engine run time may be used as a backup to ensure that the CTC systems 400, 499 do not operate in the multi-pulse CLO mode for more than a predetermined maximum amount of time. When the CLO mode is ended because the catalyst temperature or engine run time criteria have been satisfied the CTC systems 400, 499 may proceed with an exit ramping mode. The exit ramping mode may include the ramping of exhaust and intake camshaft phaser positions, the ramping of torque reserve, and spark timing. The exit ramping mode is described further below.

Transition Control While in CLO Mode

The multi-pulse mode enable module 552 may determine whether the CTC systems 400, 499 transition between single and multi-pulse modes based on a desired multi-pulse state, a current brake torque load and the current engine torque capacities. The following techniques provide a seamless transition without increases or decreases in engine output torque (spikes or drops in output torque) between single and multi-pulse modes.

Referring now also to FIG. 5, a method of determining when to transition between single pulse and multi-pulse modes is shown. The method may begin at step 700. In step 702, the multi-pulse mode enable module 552 compares the MPA signal with the MPD signal. The multi-pulse mode enable module 552 proceeds to step 704 when the MPA signal is not the same as the MPD signal, otherwise ends at step 706. The CTC systems 400, 499 may be operate in the transition mode when the MPA signal is not the same as the MPD signal.

Minimum spark advance and spark timing may be determined for the multi-pulse mode and the single pulse mode while operating in the multi-pulse mode. The engine capacity module 550 can use this information to calculate the minimum torque with the current airflow in the single pulse mode and with minimum spark advance. This may be referred to as the minimum immediate engine capacity torque in single pulse $T_{CAPMINSP}$. $T_{CAPMINSP}$ can be used to determine the authority of spark retard over torque when a transition is made from the multi-pulse mode to the single pulse mode. The transition can be made without a torque increase when the brake torque request is greater than $T_{CAPMINSP}$.

In step 704, the multi-pulse mode enable module 552 proceeds to step 708 when the MPD signal is LOW (or FALSE), otherwise to step 710. In step 710, the multi-pulse mode enable module 552 may set the MPA signal to HIGH (or TRUE). This switches operation from the single pulse mode to the multi-pulse CLO mode. In general there is no preparation needed to switch into multi-pulse mode because the engine is operating in the CLO mode with retarded spark and high airflow. This allows for the spark timing to be advanced to counteract the torque loss of transitioning into the multi-pulse mode. In step 708, the multi-pulse enable module 552 proceeds to step 712 when the brake torque $BT_{REQ}$ is greater than a minimum immediate engine capacity torque $T_{CAPMINSP}$ in the single pulse mode, otherwise ends at step 714. The criteria of step 708 is satisfied because the CLO reserve $T_{corr}$ are ramped to a low value when the MPD signal is set to LOW. This reduces the air flow and the minimum immediate engine capacity torque $T_{CAPMINSP}$ in the single pulse mode.

A torque criterion may be used to determine when a transition can be performed. The torque criteria may include determining when the brake torque request or required $BT_{REQ}$ is greater than the minimum immediate engine capacity torque $T_{CAPMINSP}$ in the single pulse mode. This may be determined based on a current air flow and minimum spark advance for the single pulse mode. The torque criteria may include equation 5, where $CAL_2$ is a second calibration offset.

$$BT_{REQ} > T_{CAPMIN} + CAL_2 \quad (5)$$

Exemplary brake torque and minimum immediate engine capacity torque $T_{CAPMINSP}$ signals are shown in FIG. 3. At point A, the multi-pulse mode enable module 552 may set the MPD signal LOW to request transition to the single pulse mode. At point B, the multi-pulse mode enable module 552 may set the MPA signal LOW to transition to the single pulse mode. At point B the minimum immediate engine capacity torque $T_{CAPMINSP}$ in the single pulse mode is approximately equal to the brake torque $BT_{REQ}$.

In step 712, the MPA signal may be set LOW. This switches operation from the multi-pulse CLO mode to the single pulse mode. Before transitioning to single pulse mode, the multi-pulse mode enable module 552 adjusts spark timing to provide sufficient spark retard (without providing spark timing that is less than a minimum spark advance) for the multi-pulse CLO mode. This reduces output torque that is provided in the multi-pulse mode with a current air per cylinder (APC) to ensure that the engine produces the same output torque before, during and after a transition from the multi-pulse CLO mode to the single pulse mode.

When in CLO mode and one of the criteria is not met to stay in the multi-pulse CLO mode (MPD is LOW), the multi-pulse mode enable module 552 operates the CTC systems 400, 499 in a transition mode. The CTC systems 400, 499 are operating in the multi-pulse mode during the transition mode.

A calibratable transition torque reserve is used in place of the normal calculation to determine the torque reserve corrected signal $T_{CORR}$ when in the transition mode. The transition torque reserve is less than the normal torque reserve corrected signal $T_{CORR}$ (of the multi-pulse CLO mode) to reduce air flow and advance spark timing.

The brake torque $BT_{REQ}$ can be satisfied when equation 5 is satisfied. The multi-pulse mode enable module 552 may set the MPD signal LOW to request a transition to the single pulse mode. Before switching from the multi-pulse mode to the single pulse mode, the exit ramping mode is enabled.

Since a smaller torque reserve is requested when transitioning from the multi-pulse mode to the single pulse mode or during the transition mode, the minimum immediate engine capacity torque $T_{CAPMINSP}$ in the single pulse mode (current air with minimum spark for single pulse mode) is reduced as the air flow is reduced. When the accelerator pedal is tipped in past a predetermined position and air flow is constant for a period, brake torque is increased to satisfy equation 5. A calibratable offset may be added to the minimum immediate engine capacity torque $T_{CAPMINSP}$ to adjust time in the transition mode or the switch time.

A transition to the multi-pulse CLO mode is performed without a misfire or a torque bump (spike or drop in engine output torque) when the criteria to re-enter the multi-pulse CLO mode is satisfied (MPD signal transitions to HIGH). The transition back to the multi-pulse CLO mode may be performed when the CTC systems 400, 499 are operating with an air flow that is greater than a predetermined air flow and spark timing is retarded to less than a predetermine angle. This is because the multi-pulse mode may use increased air flow and advanced spark timing relative to the single pulse mode. The air flow and/or spark timing is adjusted to achieve the same engine torque output in the multi-pulse mode as in the single pulse mode. In one embodiment, the air flow may be maintained constant and the spark timing may be adjusted based on a current APC.

Spark timing may be retarded to a minimum spark advance when operating in both the CLO mode and the singe pulse mode to minimize emissions. For this reason, a transition to the multi-pulse mode may have minimal preparation, as spark advance is at a minimum. A switch to the multi-pulse mode may occur upon request.

The above techniques provide control for quick transition between single and multi-pulse modes control while satisfying torque criteria and performing a CLO with minimal emissions.

Transition Control While Exiting CLO

After determining that a CLO mode is completed, the multi-pulse mode enable module 552 may exit the multi-pulse mode in a predetermined period to avoid over heating of the catalyst. The exiting of the multi-pulse mode is performed with minimal changes in engine output torque. The transition control for the multi-pulse CLO mode may be performed because of driver intervention (shift into drive or tipping in of accelerator pedal). The transition control for exiting the multi-pulse CLO mode may be performed without driver intervention. The transition control when exiting the multi-pulse CLO mode may be performed when the engine is operating at an idle speed.

Referring now to FIG. 6, a method of exiting the multi-pulse CLO mode when the CLO mode is complete is shown. The method may begin at step 750. In step 752, the multi-pulse mode enable module 552 determines whether the multi-pulse CLO mode is completed. The multi-pulse mode enable module 552 proceeds to step 754 when the multi-pulse CLO mode is completed.

In step 754, the multi-pulse mode enable module 552, signals the phaser scheduling module 544 and the CLO torque reserve module 554 that the multi-pulse CLO mode exit phase is active. The phaser scheduling module 544 ramps the cam phasers to positions for the single pulse transition. The positions provide stable combustion for both single and multi-pulse modes. The CLO torque reserve module 554 ramps the torque reserve corrected signal $T_{CORR}$ to a torque reserve that provides air flow and spark advance that are optimal for a transition to single pulse while at idle. In one embodiment, the multi-pulse mode enable module 552 uses a first spark timing or spark advance when in the multi-pulse CLO mode and a second spark timing or spark advance when in the single pulse mode. The first and second spark advance positions are provided such that the engine output torque is the same for both the single and multi-pulse modes. This spark advance change is accomplished by using the same immediate/spark torque request across the transition while switching between the torque map or models of the multi-pulse mode to torque maps or models of the single pulse mode. This mitigates a torque bump.

In step 756, the CTC systems 400, 499 may be calibrated to ramp to the common operating points from operating points used to provide an efficient CLO when in the multi-pulse CLO mode. To minimize engine output torque changes thereby making the transition unnoticeable to a vehicle driver, a ramping method is employed for camshaft phasers and torque reserve corrected signal $T_{CORR}$. The ramping method reduces air flow and increases spark advance. Time to perform the ramping method may be adjusted based on the rates at which the camshaft phaser, the torque reserve corrected signal $T_{CORR}$, the air flow and the spark timing are adjusted. The ramping transition may occur over approximately a 1-2 second period (exit ramp active stage). The time to exit the multi-pulse CLO mode when the CLO mode is complete may be longer than the time to exit the multi-pulse CLO mode when the CLO is not complete.

In step 758, the multi-pulse mode enable module 552 switches from the multi-pulse CLO mode to the single pulse mode when the air flow and phasers are at the common operating points. The switch includes a switch in spark advance from the spark advance used when in the multi-pulse CLO mode to the spark advance used when in the single pulse mode. The spark advance is adjusted based on a consistent torque request across the transition. A first torque model may be used when in the multi-pulse torque mode and a second torque model may be used when in the single pulse mode. The spark advance for the single and multi-pulse modes may be based on the respective torque model.

In one embodiment, the switch between modes occurs when the air flow, torque reserve and/or phaser positions are in the common operating points for a predetermined and/or calibratable period. In another embodiment, the switch between modes occurs when the air flow, torque reserve and/or phaser positions are in the common operating points and based on other engine operating parameters, such as brake torque and minimum immediate engine capacity for the single pulse mode. The switch in this embodiment may be based on satisfaction of equation 5.

Referring now to FIG. 7, a plot of exemplary engine control signals is shown. The engine control signals include a engine speed signal RPM, an exhaust camshaft position signal $CAM_{exh}$, an intake camshaft position signal $CAM_{int}$, a torque reserve corrected signal $T_{CORR}$, an air flow signal MAP, a spark timing signal $SPK_{ADV}$, an idle integral signal $IDLE_{int}$, a split active signal MPM, and a single late mode signal $Single_{Late}$. The signals illustrate an engine startup, operation in the multi-pulse CLO mode, operation in the ramping mode and/or transition mode, and a switch between the multi-pulse CLO mode to the single pulse mode.

A first vertical line 800 identifies when an engine is running. A second vertical line 802 indentifies when a switch from actuator-based control to torque-based control is performed. For example only, a first period 803 between when the engine is running and when the CTC systems 400, 499 switch from actuator-based control to torque-based control may be approximately 1.0 second. A third vertical line 804 identifies when the multi-pulse CLO mode is complete and a catalyst is at a predetermined temperature. A fourth vertical line 806 indentifies when a switch between the multi-pulse and signal pulse modes occurs. For example only, a second period or transition period 807 between the multi-pulse and single pulse modes may be approximately 2-3 seconds.

During startup, the speed of the engine is increased through cranking of the engine. The cranking speed is identified by portion 808 of the engine speed signal RPM. The engine speed tends to increase or flare up after the engine is running, as identified by portion 810. This is due to manifold pressure being at ambient pressure and the engine producing a corresponding high torque output. The manifold pressure is not pumped down until the engine is running at a predetermined engine speed. The engine speed may be limited to a predetermined maximum engine speed. To limit the engine speed the spark advance may be retarded, as shown by portion 812 of the spark timing signal $SPK_{ADV}$. For example only, at startup the spark advance may be at approximately 10° and at −15° during the multi-pulse CLO mode.

The CTC systems 400, 499 may operate in the single late mode while cranking the engine and switch to operating in the multi-pulse CLO mode when the engine is running, as shown by the MPM and $Single_{Late}$ signals. The CTC systems 400, 499 activate engine speed control (within the speed control module SPDR) when switching to torque-based control as shown by the increase in the idle integral signal $IDLE_{int}$ at 814 to match predicted torque requests.

After switching to torque-based control and during the multi-pulse CLO mode the exhaust and intake camshaft positions may be ramped to predetermined positions as shown at 816, 818. For example only, the intake and exhaust camshaft positions may be ramped up to approximately to 10° and 15°, respectively. Torque reserve corrected signal $T_{CORR}$ is initialized, determined and requested when torque-based control is activated. Initialization of torque reserve is described below. For example only, a third period 821 between when the engine is running and when the intake and exhaust camshafts are positioned for the multi-pulse CLO mode may be approximately 1.5 seconds.

After completion of the CLO mode, the exhaust and intake camshaft positions, the torque reserve corrected signal $T_{CORR}$, the air flow and the spark advance may be ramped to predetermined operating points, as described above and as shown at 820, 822, 824, 826, and 828. The intake and exhaust camshaft positions may return to the same positions that they were in before the engine was started or to some other positions. Throttle position is changed to reduce air flow. For example only, spark advance may increase approximately 5-8° during the transition mode, decrease approximately 1-3° when switching between the multi-pulse mode and the single pulse mode, and increase approximately 5° after the switch to the single pulse mode for idle speed operation. The torque reserve corrected signal $T_{CORR}$ may be ramped at a quicker rate than the intake and exhaust camshafts to provide a fourth or settling period 829 before switching to the single pulse mode. For example only, the settling period may be 0.5 seconds. When switching to the single pulse mode the spark advance may be retarded as shown at 830. This provides the same engine output torque before and after the switch.

After switching to the single pulse mode, the spark timing may be ramped up and the air flow may be ramped down as shown at 832, 834 for idle speed operation. This may be provided by ramping the torque reserve corrected signal $T_{corr}$ to 0 Nm.

Torque System Reserve Initialization

There is a point at which the CTC systems 400, 499 switches from a startability mode that has direct scheduling of actuators for cranking, starting and flare control to the torque-based control, which schedules actuators from torque requests. This is identified by vertical line 802 in FIG. 7. When the CTC systems 400, 499 are to transition to the torque-based control, speed control (of the speed control module SPDR) may be activated when a zero accelerator pedal position exists, otherwise torque-based control is activated.

In order to prevent jumps in actuator torque requests (torque requests that are different by more than a predetermine value) during the transition to torque-based control an initialization technique is performed. The initialization technique is used to match actuator torque requests before and after the transition.

The initialization technique includes converting an air flow request from startup control into a predicted torque request via a torque model. The idle speed control module SPDR and torque reserve system (reserve/loads module 520) then initialize to provide the predicted torque request. The initializing of the idle speed control module SPDR and the torque reserve system include: A) the setting of the torque reserve corrected signal $T_{corr}$ (may be referred to as a cold start emission torque reserve CSETR) that is equal to a torque provided with a desired cold start spark advance and a current air flow; B) the setting of a speed control predicted integral value SCPIV; and C) the setting of a delta reserve ΔR that is equal to the cold start emission torque reserve CSETR minus a SPDR steady state torque reserve SSTR. The predicted torque reserve or torque reserve PTR provided to the propulsion torque arbitration module 506 may be a function of the cold start emission torque reserve CSETR, the speed control predicted integral value SCPIV and the delta reserve ΔR, as shown by equation 6.

$$T_{PR}=f\{CSETR,SCPIV,\Delta R\} \quad (6)$$

The speed control predicted integral value SCPIV is equal to a startability predicted torque SPT minus the cold start emissions torque reserve CSETR minus transmission load minus the SPDR steady state torque reserve SSTR, as shown by equation 7. The delta reserve is shown in equation 8.

$$SCPIV=SPT-CSETR-SSTR \quad (7)$$

$$\Delta R=CSETR-SSTR \quad (8)$$

The spark advance that is used to limit the engine speed during startup is translated to a torque value $SPARK_{limit}$. Idle speed control module SPDR then initializes to provide the torque value $SPARK_{limit}$ by determining a speed control immediate integral value that is equal to the torque at startup (for the spark advance and current air flow) minus transmission load.

The above torque-based control, speed control, idle control, startability control and air flow control may be performed by a respective one or more of the propulsion torque arbitration module 506, the idle speed control module SPDR, the reserves/loads module 520, the multi-pulse mode enable module 552, and the air control module 528 and/or respective torque-based control, speed control, idle control, and air flow control modules and/or systems.

Air Flow Initialization on MPM Transition

Air flow may remain constant when transitioning between the multi-pulse CLO mode and the single pulse mode (from the multi-pulse CLO mode to the single pulse mode or visa versa). A ramping of air flow may occur after the transition. This allows air flow control to react quickly to adjust produced torque (to reject torque or produce additional torque) to provide the same torque output when combining or splitting fuel pulses in one cylinder event. The air flow may be maintained at a constant level to improve the air estimation and fuel delivery algorithms. This can be done because air may not be used to counteract the torque change when pulses are split or combined. One cylinder event may refer to a combustion cycle event of a cylinder or a stroke of a cylinder.

The multi-pulse cold start emission control is active during cold starts when the ability to estimate air and determine fuel mass for a particular air mass is reduced. Transients in air flow can negatively affect emission output. Cold start emissions air flow control prevents transients in air flow and provides controlled and gradual or ramped changes in air flow when a change in air flow is requested.

When there is a transition from the multi-pulse mode to the single pulse mode or vice versa, the CTC systems 400, 499 switch between torque models. This changes the relationship between torque and actuator requests. A different torque request may be generated to achieve a constant air flow. For example when transitioning from the multi-pulse mode to the single pulse mode a torque request (for the single pulse mode) may be generated that is greater (to achieve the same high flow in single pulse the torque request is higher) than a current torque request (for the multi-pulse mode) to provide or allow for the same air flow.

Equation 9 may be used to determine desired air torque $T_{Des}$ at idle, where $BT_{PredDes}$ is predicted brake torque desired and $\Delta R$ is the change in reserve torque.

$$T_{Des} = BT_{PredDes} + \Delta R \tag{9}$$

From, equation 9, the desired APC may be equal to the inverted torque model or desired air torque $T_{Des}$. A desired APC commanded before the transition between the multi-pulse and single pulse modes may be stored to allow for an APC match across the transition. For example, when transitioning from the multi-pulse CLO mode to the single pulse mode equations 10 and 11 may be used to determine the desired multi-pulse mode APC and the single pulse mode APC.

$$APC_{DesMPM} = ITM_{MPM}\{BT_{PredDes}, \Delta R_{MPM}\} = APC_{saved} \tag{10}$$

$$APC_{DesSPM} = ITM_{SPM}\{BT_{PredDes}, \Delta R_{SPM}\} \tag{11}$$

$APC_{DesMPM}$ is the desired APC for the multi-pulse CLO mode. $ITM_{MPM}$ is the inverted torque model for the multi-pulse CLO mode as a function of the desired predicted brake torque from the idle speed control module SPDR when at idle and the delta reserve for the multi-pulse CLO mode. The inverted torque model for the multi-pulse mode may be a function of the desired predicted brake torque from the idle speed control module SPDR when at idle plus the delta reserve for the multi-pulse CLO mode. $APC_{saved}$ is the saved desired APC. $ITM_{SPM}$ is the inverted torque model for the single pulse mode as a function of the desired predicted brake torque from the idle speed control module SPDR when at idle and the delta reserve for the single pulse CLO mode. The inverted torque model for the single pulse mode may be a function of the desired predicted brake torque from the idle speed control module SPDR when at idle plus the delta reserve for the single pulse CLO mode. Equation 12 may be derived from equations 10 and 11.

$$APC_{savedMPM} = ITM_{SPM}\{BT_{PredDes}, \Delta R_{MPM}\} \tag{12}$$

Converting equation 12 for torque based control provides equation 13, where $TME_{APCSPM}$ is torque model estimation of APC to torque with single pulse torque model using the saved desired APC from the multi-pulse CLO mode.

$$TME_{APCSPM} = BT_{PredDes} + \Delta R_{MPM} \tag{13}$$

The delta reserve for the single pulse mode $\Delta R_{SPM}$ may be determined using equation 14.

$$\Delta R_{SPM} = TME_{APCSPM}\{APC_{savedMPM}\} - BT_{PredDes} \tag{14}$$

From the above, the air flow torque request provides the same air flow before, during and after a transition between the single and multi-pulse modes. The reserve/loads module or reserve system may be initialized to provide the air torque request using the desired predicted brake torque. The air flow request may change when different brake torque requests are provided, which may be based on driver inputs. When a driver tips out (the accelerator pedal is returned to the zero pedal position) at the same time as this initialization is performed, the corresponding brake torque request decreases. To compensate, the initialization is performed to provide the torque reserve saved before the transition while decreasing air flow. The torque reserve and/or the desired predicted brake torque of equation 14 may be stored before the transition and used when the driver tips out.

When a driver tips in (the accelerator pedal is depressed) at the same time as this initialization is performed, the corresponding brake torque request increases. The air flow may be maintained at a constant level when the driver predicted brake torque is constant. The air flow is increased when the driver tips in. In this circumstance equation 15 may be used instead of equation 14, where $BT_{PredDesSaved}$ is desired predicted brake torque saved before transition from the idle speed control module SPDR at idle.

$$\Delta R_{SPM} = TME_{APCSPM}\{APC_{savedMPM}\} - BT_{PredDesSaved} \tag{15}$$

Fast Actuator Control

Desired brake torque (crankshaft torque) or torque output of the engine is followed when performing a transition from the multi-pulse CLO mode to single pulse mode or vice versa to prevent torque discontinuities in torque output. Discontinuities, such as jumps, flares or sags in torque output at idle are prevented. This is accomplished by generating a torque request that is based on driver input torque demands (e.g., accelerator pedal position) and/or torque for idle speed control. The torque requested is provided via fast actuator control. Fast actuators are controlled with an immediate torque request.

An immediate torque request is generated for torque output before, after and during (across) the transition between single and multi-pulse CLO modes. A torque model relationship of engine output torque to spark advance timing changes based on operation in the multi-pulse CLO mode and operation in the single pulse mode. For example, with a transition with a steady immediate/spark torque request, the spark advance timing is changed to achieve the same torque level before and after the transition. Typically the spark advance timing is retarded when transitioning from the multi-pulse mode to the single pulse mode given the same air flow. Initialization is performed to provide this consistent immediate torque request across the transition when the immediate torque request is derived from engine operating conditions, which may include the multi-pulse mode.

The above-described techniques provide for the operation in a multi-pulse mode and account for various factors, such as transmission state, driver torque request, air density, engine temperature, etc. The techniques minimize catalytic converter costs through improved emissions controls while simultaneously or during the same period providing good drivability. For example, with decreased emission generation, a decreased amount of catalyst is needed in an exhaust system. The techniques have minimal calibration settings and minimize torque output changes during a transition between single and multi-pulse modes.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A coordinated torque control (CTC) system comprising:
an engine capacity module that determines a torque capacity of an engine and that generates a maximum engine torque capacity signal;
a multi-pulse enable module that enables a multi-pulse mode that includes the injection of at least two pulses of fuel into a cylinder of the engine during a combustion cycle,
wherein the multi-pulse enable module generates a multi-pulse desired signal to operate in the multi-pulse mode based on the maximum engine torque capacity signal, a catalyst light off signal, a brake torque request signal, and a torque reserve corrected signal; and
a catalyst light off torque reserve module that generates the torque reserve corrected signal based on the multi-pulse desired signal.

2. The CTC system of claim 1, wherein the multi-pulse enable module generates the multi-pulse desired signal based on an engine speed signal and a barometric pressure signal.

3. The CTC system of claim 1, wherein the catalyst light off torque reserve module generates the torque reserve corrected signal based on an air per cylinder signal and an engine speed signal.

4. The CTC system of claim 1, further comprising:
a reserve and load module that generates an output based on the torque reserve corrected signal; and
an actuator module that generates an air torque request signal and a spark torque request signal based on the output.

5. The CTC system of claim 1, wherein the multi-pulse enable module transitions from the multi-pulse mode to a single pulse mode when a sum of the brake torque request signal and the torque reserve corrected signal is greater than or equal to the maximum engine torque capacity signal plus an offset.

6. The CTC system of claim 1, wherein the multi-pulse enable module enables operation in the multi-pulse mode when speed of the engine is within a first predetermined range and ambient air pressure is greater than a predetermined air pressure.

7. The CTC system of claim 6, wherein the multi-pulse enable module maintains a multi-pulse desired signal state when the engine speed is within a second predetermined range.

8. The CTC system of claim 1, wherein the multi-pulse enable module generates a multi-pulse actual signal to switch from the multi-pulse mode to a single pulse mode when the brake torque request signal is greater than or equal to a minimum immediate engine capacity torque for the single pulse mode plus an offset.

9. The CTC system of claim 1, wherein the multi-pulse enable module transitions to the multi-pulse mode when the multi-pulse desired signal indicates a multi-pulse mode request and the multi-pulse actual signal indicates a single-pulse mode request.

10. The CTC system of claim 1, wherein the multi-pulse enable module transitions to a single pulse mode when the multi-pulse desired signal indicates a single pulse mode request, a multi-pulse actual signal indicates a multi-pulse mode request, and the brake torque request signal is greater than a minimum immediate engine capacity torque for the single pulse mode plus an offset.

11. The CTC system of claim 1, wherein the multi-pulse enable module initiates an exit ramping mode to transition from the multi-pulse mode to a single pulse mode when a catalyst light off mode is complete.

12. The CTC system of claim 11, further comprising a phaser scheduling module that ramps phaser positioning during the exit ramping mode.

13. The CTC system of claim 11, further comprising an air flow actuator module that ramps air flow during the exit ramping mode based on a ramping of the torque reserve corrected signal,
wherein the catalyst light off torque reserve module provides the ramping of the torque reserve corrected signal during the exit ramping mode.

14. The CTC system of claim 11, further comprising a spark actuator module that ramps spark during the exit ramping mode based on a ramping of the torque reserve corrected signal,
wherein the catalyst light off torque reserve module provides the ramping of the torque reserve corrected signal during the exit ramping mode.

15. The CTC system of claim 1, further comprising a spark actuator module that adjusts spark timing based on a multi-pulse actual signal,
wherein the multi-pulse enable module generates the multi-pulse actual signal to switch from the multi-pulse mode to a single pulse mode,
wherein the spark actuator module retards spark timing of the engine when switching from the multi-pulse mode to the single pulse mode, and
wherein the spark actuator module retards the spark timing such that a first output torque of the engine generated during the multi-pulse mode is equal to a second output torque of the engine generated during the single pulse mode.

16. The CTC system of claim 1, wherein the multi-pulse desired signal is generated based on the torque reserve corrected signal, and
wherein the multi-pulse desired signal is the same as the torque reserve corrected signal when the CTC system is operating in the multi-pulse mode.

17. A method of operating a coordinated torque control (CTC) system comprising:
determines a torque capacity of an engine and generating a maximum engine torque capacity signal;
enabling a multi-pulse mode that includes the injection of at least two pulses of fuel into a cylinder of the engine during a combustion cycle; and
generating a multi-pulse desired signal to operate in the multi-pulse mode based on the maximum engine torque capacity signal, a catalyst light off signal, and a brake torque request signal,
wherein the multi-pulse desired signal is generated based on a torque reserve corrected signal.

18. The method of claim 17 wherein the multi-pulse mode is enabled when a sum of the brake torque request signal and the torque reserve corrected signal is less than the maximum engine torque capacity signal plus an offset.

19. The method of claim 18 further comprising maintain output torque of the engine at a constant level when transitioning between the multi-pulse mode and a single pulse mode by adjusting spark timing of the engine by generation of a torque request and use of a torque model that is based on the multi-pulse mode and a single-pulse mode.

* * * * *